United States Patent [19]

Kaniecki et al.

[11] Patent Number: 4,515,199

[45] Date of Patent: May 7, 1985

[54] COATING MATERIAL FOR USE ON SULFUR VULCANIZED RUBBER

[75] Inventors: Michael Kaniecki, Kent; Samuel P. Landers, Uniontown; Thomas J. Botzman, Akron, all of Ohio

[73] Assignee: The Goodyear Tire & Rubber Company, Akron, Ohio

[21] Appl. No.: 620,346

[22] Filed: Jun. 13, 1984

[51] Int. Cl.[3] ........................ B60C 5/00; B60C 11/00; B60C 13/00; B60C 15/00

[52] U.S. Cl. ............................ 152/353 R; 152/353 C; 152/353 G; 156/116; 427/256; 427/385.5; 428/519; 524/403

[58] Field of Search .................... 156/116; 152/353 R, 152/353 C, 353 G; 427/256, 385.5; 428/519; 524/403

[56] References Cited

U.S. PATENT DOCUMENTS

| | | | |
|---|---|---|---|
| 1,741,997 | 12/1929 | Lerch | 427/275 |
| 1,784,118 | 12/1930 | Smithers | 427/286 |
| 3,623,900 | 11/1971 | Stillwater et al. | 428/194 |

*Primary Examiner*—Joseph L. Schofer
*Assistant Examiner*—N. Sarofim
*Attorney, Agent, or Firm*—L. R. Drayer

[57] ABSTRACT

Metallic particles are suspended in a solution that contains diene rubber solids and a sulfur rubber vulcanization accelerator dissolved therein. The coating material is substantially free of carbon black and free sulfur. The accelerator scavenges sulfur from an already vulcanized rubber substrate to auto-vulcanize the rubber solids and thereby secure the metallic particles in a coating on a rubber article.

8 Claims, No Drawings

COATING MATERIAL FOR USE ON SULFUR VULCANIZED RUBBER

BACKGROUND OF THE INVENTION

This invention relates to a coating material that can be used on sulfur vulcanized rubber articles such as tires and hoses, and to sulfur vulcanized articles that have indicia or an ornamental design applied thereon with this new coating material.

The marking of indicia or ornamental designs on prevulcanized rubber articles with a coating material, such as paint, has been felt to be desirable for a long time. For instance, U.S. Pat. Nos. 1,741,997 and 1,784,118, both issued in 1928, taught the use of colored rubber cements for making ornamental designs on tire sidewalls. U.S. Pat. Nos. 2,088,561, issued in 1937, taught a "liquid tire cover" that was essentially a paint applied to a preformed tire. However, as pointed out at column 1, lines 65 to 73 of U.S. Pat. No. 3,623,900, issued in 1971: "These suggestions have never lead to satisfactory tires, principally because the materials suggested as the rubber cement or rubber solution were inadequate to provide colored sidewall facings of the necessary adhesion to the rest of the vulcanized tire and durability. After a period of time, a tire sidewall facing applied according to the teaching of these prior suggestions cracked and delaminated from the tire."

Various other materials that have been proposed for use as coatings on vulcanized rubber articles include epoxy systems (U.S. Pat. No. 3,623,900 issued in 1971), fluorescent paint (U.S. Pat. No. 3,607,498 issued in 1971), and polyurethane (U.S. Pat. Nos. 3,979,547 issued in 1976 and 4,136,219 issued in 1979).

SUMMARY OF THE INVENTION

There is provided in accordance with an aspect of the invention a liquid coating material for use on a pre-vulcanized rubber article containing free sulfur comprising: a rubber cement containing unvulcanized diene rubber, the total weight of said rubber being not greater than 10% of the weight of said liquid coating material, 0.1 to 10 phr of a sulfur rubber vulcanization accelerator; and 1 to 500 phr of particulate metallic particles that can pass through a number 325 mesh U.S. Standard Sieve, said liquid coating material being substantially free of carbon black and free sulfur.

There is provided in accordance with another aspect of the invention a liquid coating material for use on a sulfur vulcanized rubber article comprising: (a) a solution comprising, by weight, 5 to 90% toluene, not greater than 40% acetone, not greater than 25% chlorinated solvent, and not greater than 90% gasoline; (b) unvulcanized diene rubber dissolved in said solution, the total weight of said rubber being not greater than 10% of the weight of said coating material; (c) 0.1 to 10 phr of a sulfur rubber vulcanization accelerator; and (d) 1 to 500 phr of particulate metallic particles than can pass through a number 325 mesh U.S. Standard Sieve, said liquid coating material being substantially free of carbon black and free sulfur.

There is provided in accordance with another aspect of the invention a method of manufacturing an article having indicia or an ornamental design thereon comprising the steps of: (a) providing an article comprising at least an outer layer of pre-vulcanized rubber containing free sulfur therein; (b) applying a coating between 0.001 and 0.010 inches thick of a liquid coating material comprising a rubber cement that contains unvulcanized diene rubber, the total weight of said rubber being not greater than 10% of the weight of said liquid coating material; 0.1 to 10 phr of a sulfur rubber vulcanization accelerator; and 1 to 500 phr of particulate metallic particles that can pass through a number 325 mesh U.S. Standard Sieve, said liquid coating material being substantially free of carbon black and free sulfur; and (c) allowing the rubber contained in said coating material to be auto-vulcanized. There may be further provided in accordance with another aspect of this invention an article manufactured according to the foregoing process.

There is provided in accordance with another aspect of the invention a method of manufacturing an article having indicia or an ornamental design thereon comprising the steps of: (a) providing an article comprising at least an outer layer of pre-vulcanized rubber containing free sulfur therein; (b) applying a coating between 0.001 and 0.010 inches thick of a liquid coating material to a surface of said pre-vulcanized rubber, said liquid coating material comprising: (i) a solution comprising, by weight, 5 to 90% toluene, not greater than 40% acetone, not greater than 25% chlorinated solvent, and not greater than 90% gasoline; (ii) unvulcanized diene rubber dissolved in said solution, the total weight of said rubber being not greater than 10% of the weight of said liquid coating material; (iii) 0.1 to 10 phr of a sulfur rubber vulcanization accelerator; and (iv) 1 to 500 phr of particulate metallic particles that can pass through a number 325 mesh U.S. Standard Sieve, said liquid coating material being substantially free of carbon black and free sulfur; and (c) allowing the rubber contained in said coating material to be auto-vulcanized. There may be further provided in accordance with another aspect of this invention an article manufactured according to the foregoing process.

DETAILED DESCRIPTION OF THE INVENTION

Tires, hoses, balls, conveyor belts and other articles of manufacture that comprise vulcanized rubber are often subject to flexing, twisting, or other manners of distortion during their useful lives. Furthermore, such articles may be subjected to extreme climatic conditions and aging processes due to chemical reactions of the vulcanized rubber with the atmosphere. The problem of providing a coating material for marking indicia or ornamental designs on already vulcanized rubber articles has been a challenge to those persons working in the rubber industry for many years, as evidenced by the patents cited in the preceding text.

The liquid coating material, or paint, of the present invention reacts with a pre-vulcanized rubber substrate containing free sulfur to provide a coating of metallic particles actually embedded in vulcanized rubber that is superposed on the surface of the substrate. As used herein, "free sulfur" refers to sulfur in a zero valence state that is not involved in the vulcanization of rubber in a substrate or a coating material. This improved coating comprises numerous small metallic particles substantially embedded in auto-vulcanized rubber and is capable of distorting along with the vulcanized rubber substrate of the article that is coated with the new liquid coating material. While it is believed that the metallic particles will not be readily ejected from the surface of an article due to distortion of the article, it is an advantage of the present invention that the coating can be touched up without requiring the use of any special vulcanizing equipment. As used herein, "auto-vulcanizing" and "auto-vulcanized" refer to the vulcanization of rubber through a sulfur vulcanization accelerator or ultra-accelerator at the ambient temperature, which is accomplished by scavenging the free sulfur from a substrate. That is to say, if a person owns a tire with a stripe painted on the sidewall with the new coating material he can touch up a portion of the stripe that has been accidentally abraded against a curb by merely brushing on some more liquid coating material right in his own driveway and then allowing the rubber in the coating material to be auto vulcanized.

It is believed that the coating material of this invention is utilitarian because it utilizes the free sulfur contained in nearly all sulfur vulcanized rubber articles by allowing it to be diffused or scavenged into the coating material where the vulcanization accelerator in the coating material facilitates the auto-vulcanization of the diene rubber in the coating material to form a matrix adhered to both the pre-vulcanized rubber substrate and the metallic particles in the coating. It is understood that the solvent in which the diene rubber is dissolved will be disposed of basically by evaporation into the atmosphere.

The following examples illustrate embodiments of the new coating material.

EXAMPLE I

Fine metal powder, for example Gold #34 commercially available from the Leo Uhlfelder Co. of Mount Vernon, N.Y., was mixed into a commercially available fast drying self-vulcanizing rubber cement, for example Patch Rubber Company stock number 16-451. After thoroughly agitating the mixture to dispense the metallic particles, the liquid coating material was brushed onto a clean dry surface of a rubber tire sidewall.

The rubber cement contained about 5½% of unvulcanized polyisoprene rubber solids by weight, along with a rubber vulcanization accelerator.

The liquid coating material must be substantially free of free sulfur. "Substantially free of free sulfur" is understood to mean a free sulfur content of not greater than 0.1 phr. This is a critical feature of the invention because a higher free sulfur content may cause significant vulcanization of the diene rubber and reduce the shelf life and/or reduce the viscosity of the liquid coating material to an unacceptable level. It is preferred that the unvulcanized diene rubber in the coating material be selected from the group consisting of cis 1,4 polyisoprene rubber (either natural or synthetic), polybutadiene rubber, and styrene/butadiene copolymer rubber. Most preferably, the rubber solids in the coating material are natural rubber, but it is understood that any of the aforementioned rubbers or a combination of them can be used in the coating material. The reason for using these particular rubbers is that when vulcanized they will have physical characteristics that most nearly correspond to those of an underlying vulcanized rubber substrate. The coating material of the invention should also be substantially free of carbon black which would detract from the desired color of the coating material. As used herein, the coating material is substantially free of carbon black if it contains less than 0.1 phr of carbon black.

The size of the metallic particles is felt to be critical to the invention because if the particles are too large much of their bulk will protrude from the vulcanized rubber layer of the coating and they will be too readily ejected during deformation of the coated article. Optimally, to accommodate sulfur diffusion, the layer of liquid coating material applied to the vulcanized rubber surface should have a thickness of between about 0.0254 mm (0.001 in.) and 0.0508 mm (0.002 in.), so the preferred size of the metallic particles is such that the particles can pass through a number 325 mesh U.S. Standard Sieve. It is understood that a number 325 mesh U.S. Standard Sieve comprises 127 meshes per linear cm. (323 meshes per linear in.), and has sieve openings of 0.044 mm (0.0017 in.). The metallic particles are a particulate when the coating material is in a liquid state. Most preferably, the metallic particles are in the form of flakes. For the purpose of this invention, a "flake" is a particle having two or more substantially flat opposing sides. Flakes are more preferable than spheres because they present a greater surface area for adherence to the auto-vulcanized rubber matrix of the coating. It is understood that "metallic" refers not only to pure metallic elements, but also to any alloy that will impart a desired color to the coating material. Of course, the volume of metallic particles in the coating material will depend on the exact finish of the coated surface that is desired, but it is preferable that the metallic particles comprise not greater than 25% of the volume of a coating comprised of the new material in order to maintain adequate adherence to the auto-vulcanized rubber matrix. Put another way, the coating material should contain 1 to 500 parts per hundred rubber (phr), preferably 10 to 100 phr of metallic particles.

EXAMPLE II

Silver coating material for use on sulfur vulcanized rubber was prepared according to the following procedure.

1. A solution was prepared at room temperature comprising 53% toluene, 14% acetone, 3% trichloroethane and 30% deodorized gasoline. The trichloroethane may be replaced by any chlorinated solvent, such as trichloroethylene. The deodorized gasoline, commonly referred to in the rubber industry as naphtha, may be replaced by any material similar to the commonly used grades of gasoline.

2. Powdered substantially sulfur free natural rubber was dissolved in the solution prepared in step 1 at 3% by weight. Hot rubber cut from a mill may be used instead of powdered rubber. It is understood that any of the rubbers contained in the group set forth above may be used in the coating material. While the percentage of unvulcanized diene rubber in the liquid coating material should not exceed 10% by weight, it more preferably does not exceed 6% and most preferably does not exceed 3%. This limitation is desirable because at concentrations of greater than 10% the liquid coating material becomes very thick and gives a streaked appearance after it dries, while lower concentrations give more favorable results.

3. Tetramethylthiuram disulfide (TMTD) at 0.3 parts by weight rubber was added to the mixture produced in step 3. TMTD is a rubber sulfur vulcanization accelerator, and may be replaced by an appropriate amount of another accelerator, selected for example from the following classes: Amines, Guanidines, Thioureas, Dithiocarbamates, Thiurams, Sulfenamides, and Thiazoles. It is understood, however, that an excess of accelerator is preferred to underacceleration.

4. Aluminum metallic particles, purchasable from the Leo Uhlfelder Co. of Mount Vernon, N.Y., and labeled as "Superlative Chrome Aluminum Lining", was added to the mixture produced in step 3 at slightly less than 1% by weight. The metallic particles used were a "400 mesh powder" and 100% of the particles passed through a number 325 mesh American Standard Sieve. It is understood that the metallic particles may be selected in accordance with the desired appearance of the coating material after application.

The proportions of the contents of the solution mixed in step one may vary widely depending upon the selected method of coating material application and the desired drying time for the coating material. The ranges are: toluene 5 to 90%; acetone less than 40%; chlorinated solvent less than 25%; and mixed hydrocarbons (gasoline) less than 90%, by weight. More preferably the ranges are: 50 to 55% toluene; 12 to 16% acetone; 1 to 5% chlorinated solvent; and 25 to 35% gasoline.

The vulcanized rubber surface that is to be coated should be clean and dry. It is advantageous to prewash the surface with a solution similar to that manufactured in step 1 of Example 2. The liquid coating material should be well agitated before application because the metallic particles are in suspension and may settle during storage of the liquid coating material. The liquid coating material may be applied by brushing, spraying, rolling, dipping, or any other suitable means, at about room temperature.

In accordance with another embodiment of the invention a method of manufacturing an article comprises the steps of: (a) providing an article comprising at least an outer layer of pre-vulcanized rubber containing free sulfur therein; (b) applying a coating between 0.001 and 0.010 inches (between 0.025 mm and 0.25 mm) thick, preferably between 0.001 and 0.002 inches (between 0.025 mm and 0.050 mm) thick, of a liquid coating material in accordance with the invention disclosed herein to a surface of said pre-vulcanized rubber; and (c) allowing the diene rubber in the coating material to be auto-vulcanized. An article manufactured in accordance with this process is also understood to be an embodiment of the present invention. Examples of such articles are rubber tires having indicia or ornamental designs applied to one or both sidewalls.

It will be apparent that changes and modifications may be made in the invention by those skilled in the art without deviating from the scope of the invention.

What is claimed is:

1. A method of manufacturing an article having indicia or an ornamental design thereon comprising the steps of:

(a) providing an article comprising at least an outer layer of pre-vulcanized rubber containing free sulfur therein;

(b) applying a coating between 0.001 and 0.010 inches thick of a liquid coating material to a surface of said pre-vulcanized rubber, said liquid coating material comprising a rubber cement that contains unvulcanized diene rubber, the total weight of said rubber being not greater than 10% of the weight of said liquid coating material; 0.1 to 10 phr of a sulfur rubber vulcanization accelerator; and 1 to 500 phr of particulate metallic particles that can pass through a number 325 mesh U.S. Standard Sieve, said liquid coating material being substantially free of carbon black and free sulfur; and (c) allowing the rubber contained in said coating material to be auto-vulcanized.

2. A method of manufacturing an article according to claim 1 wherein the coating applied in step (b) is between 0.001 and 0.002 inches thick.

3. An article manufactured according to the method described in either one of claims 1 or 2.

4. An article according to claim 3 wherein said article is a tire.

5. A method of manufacturing an article having indicia or an ornamental design thereon comprising the steps of:

(a) providing an article comprising at least an outer layer of pre-vulcanized rubber containing free sulfur therein;

(b) applying a coating between 0.001 and 0.010 inches thick of a liquid coating material to a surface of said pre-vulcanized rubber, said liquid coating material comprising:

(i) a solution comprising, by weight, 5 to 90% toluene, not greater than 40% acetone, not greater than 25% chlorinated solvent, and not greater than 90% gasoline;

(ii) unvulcanized diene rubber dissolved in said solution, the total weight of said rubber being not greater than 10% of the weight of said liquid coating material;

(iii) 0.1 to 10 phr of a sulfur rubber vulcanization accelerator; and (iv) 1 to 500 phr of particulate metallic particles that can pass through a number 325 mesh U.S. Standard Sieve, said liquid coating material being substantially free of carbon black and free sulfur; and (c) allowing the rubber contained in said coating material to be auto-vulcanized.

6. A method of manufacturing an article according to claim 5 wherein the coating applied in step (b) is between 0.001 and 0.002 inches thick.

7. An article manufactured according to the method described in either one of claims 5 or 6.

8. An article according to claim 7 wherein said article is a tire.

* * * * *